(12) United States Patent
Farris et al.

(10) Patent No.: US 8,060,417 B2
(45) Date of Patent: Nov. 15, 2011

(54) DATE EFFECTIVE QUANTITY ON HAND AND ADJUSTED UNIT COST CALCULATION

(75) Inventors: Kay Farris, Fargo, ND (US); Dan Lothspeich, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 11/280,730

(22) Filed: Nov. 16, 2005

(65) Prior Publication Data

US 2007/0112691 A1    May 17, 2007

(51) Int. Cl.
*G07B 17/00* (2006.01)
(52) U.S. Cl. .................. 705/30; 705/8; 705/10; 705/26; 705/27; 705/28; 705/29; 705/34; 705/35
(58) Field of Classification Search ................ 705/30
See application file for complete search history.

(56) References Cited

U.S. PATENT DOCUMENTS

| | | | |
|---|---|---|---|
| 5,117,356 A | 5/1992 | Marks | |
| 5,615,109 A * | 3/1997 | Eder .................................. | 705/8 |
| 5,875,435 A | 2/1999 | Brown | |
| 6,513,019 B2 * | 1/2003 | Lewis .............................. | 705/35 |
| 6,584,453 B1 | 6/2003 | Kaplan et al. | |
| 6,807,533 B1 | 10/2004 | Land et al. | |
| 7,092,929 B1 * | 8/2006 | Dvorak et al. ................... | 705/28 |
| 7,467,103 B1 * | 12/2008 | Murray et al. ................... | 705/26 |
| 2001/0029475 A1 | 10/2001 | Boicourt et al. | |
| 2002/0002517 A1 | 1/2002 | Fox | |
| 2002/0111891 A1 | 8/2002 | Hoffman et al. | |
| 2004/0172321 A1 * | 9/2004 | Vemula et al. .................... | 705/8 |
| 2005/0125251 A1 | 6/2005 | Berger et al. | |
| 2005/0234786 A1 * | 10/2005 | Aggarwal ........................ | 705/30 |
| 2007/0011011 A1 | 1/2007 | Umapathy | |
| 2007/0179872 A1 | 8/2007 | Macalka et al. | |

FOREIGN PATENT DOCUMENTS

KR    10-2005-0039120    4/2005

OTHER PUBLICATIONS

Telekomunikacja Pol.—SAR-2002-report-part 3 (PART -3 of SAR-2002 REP) CNF , Apr. 4, 2003.*
International Search Report for PCT/US2006/040288 mailed Mar. 30, 2007.
Written Opinion for PCT/US2006/040288 mailed Mar. 30, 2007.
Accounting Software Update, "In the Black: Real Accounting, Real Easy—Really?", Accounting Technology, Publication New York, NY: Faulkner & Gray, Jul. 1994, pp. 9-10, 12.
Business Software for Managers Who Use PCs, "Skating into Double-Entry Accounting", pp. 3, 50, 54-57, vol. 6, No. 2, Feb. 1988.
"Establishing Accounting Principles as Invariants of Financial Systems," Naftaly H. Minsky, Integrity Internal Control and Security in Information Systems, pp. 41-56, Connecting Governance and Technology 2002 (NO) 83.
"Annals of Operations Research,," Robert A. Nehrner and Derek Robinson, "An algebraic model for the representation of accounting systems," pp. 179-198, Baltzer Science Publishers, vol. 71, 1997.

(Continued)

*Primary Examiner* — F. Zeender
*Assistant Examiner* — Fawaad Haider

(57) ABSTRACT

An accounting method can insert changes that affect average cost calculations after the initial average cost calculations. The method can go back in time and add in transactions that affect average cost and re-calculate average cost based on the added entry to all entries after the added entry.

18 Claims, 5 Drawing Sheets

OTHER PUBLICATIONS

"Accounting Software Update," Financial Navigator, Accounting Technology, Publication New York, NY: Faulkner & Gray, Feb./Mar. 1996, pp. 10-13.

"Newviews, The Visual Approach to Accounting," Financial Control Management, Micro Decision, Business Solutions for PC Buyers, Jun. 1991, Cover and p. 129.

Management Accounting for Corporate Financial Decision, "Everything You Always Wanted to Know About Checks, Reporting Corporate Cash Flows," Jul. 1990, Cover and pp. 2, 4, and 16, Jul. 1990.

Accountancy, the Journal of the Institute of Chartered Accountants in England and Wales, The Business of Sport, Project Overkill, "Double Entry Still Exists—After a Fashion," Cover, pp. 1, 132 and 133, Apr. 1987.

AgriComp, The Reference for Farm Computing, "Why Double Entry Accounting? . . . the step beyond single entry," Cover and pp. 4 and 46-48.

U.S. Appl. No. 10/804,947, filed Mar. 18, 2004.

Final Office Action for U.S. Appl. No. 10/815,093 dated Jul. 3, 2008.

* cited by examiner

| | Purchase Receipts Inquiry | | | | | | □ X |
|---|---|---|---|---|---|---|---|
| ✓ OK | | | | | | | |

Item Number  1 1/2"SASH BRSH
Description  Craftsman Brush 1 1/2" Sash

Site ID  [ ] BOZEMAN ▲ 🔍

Date:  ⦿ All  ○ From: 00/00/0000 📅 To 00/00/0000 📅

| Site ID | Quantity Received | Date | Quantity Sold | Cost | | |
|---|---|---|---|---|---|---|
| Type | Receipt Number | Qty. Type | Purchase Order No. | | Vendor ID | |
| BOZEMAN | 25.00 | 01/14/1999 | 25.00 | $3.96 | | |
| BOZEMAN | 20.00 | 02/03/1999 | 17.50 | $3.92 | | |
| BOZEMAN | 20.00 | 04/19/1999 | 0.00 | $3.95 | | |
| BOZEMAN | 10.00 | 10/18/2005 | 6.00 | $2.00 | | |
| | | | | | | |
| | | | | | | |

Quantities:  On Hand  26.50   Current Cost  $10.00
             Available 26.50   Standard Cost $3.95 by Item Number  ▶

DATE EFFECTIVE QUANTITY ON HAND AND ADJUSTED UNIT COST CALCULATION

BACKGROUND

Electronic, computer driven accounting systems have virtually replaced paper based accounting systems. As a result, accounting data is stored in an electronic format which may allow users significant opportunities to use this data to make additional calculations to provide further insights into a business. Efforts have been made to more accurately track revenue and costs but these efforts have been rigid in application and may not take into account unusual or unexpected events that human users all too often create or must be capable of handling.

SUMMARY

An accounting method can insert changes that affect average cost calculations after the initial average cost calculations. The method can go back in time and add in transactions that affect average cost and re-calculate average cost based on the added entry to all entries after the added entry. In addition, adjustments to the general ledger can automatically be created based on the revised average cost calculation. Security measures may be implemented to ensure that malicious users cannot adjust accounting entries in the past using the method.

DRAWINGS

Figure 5:
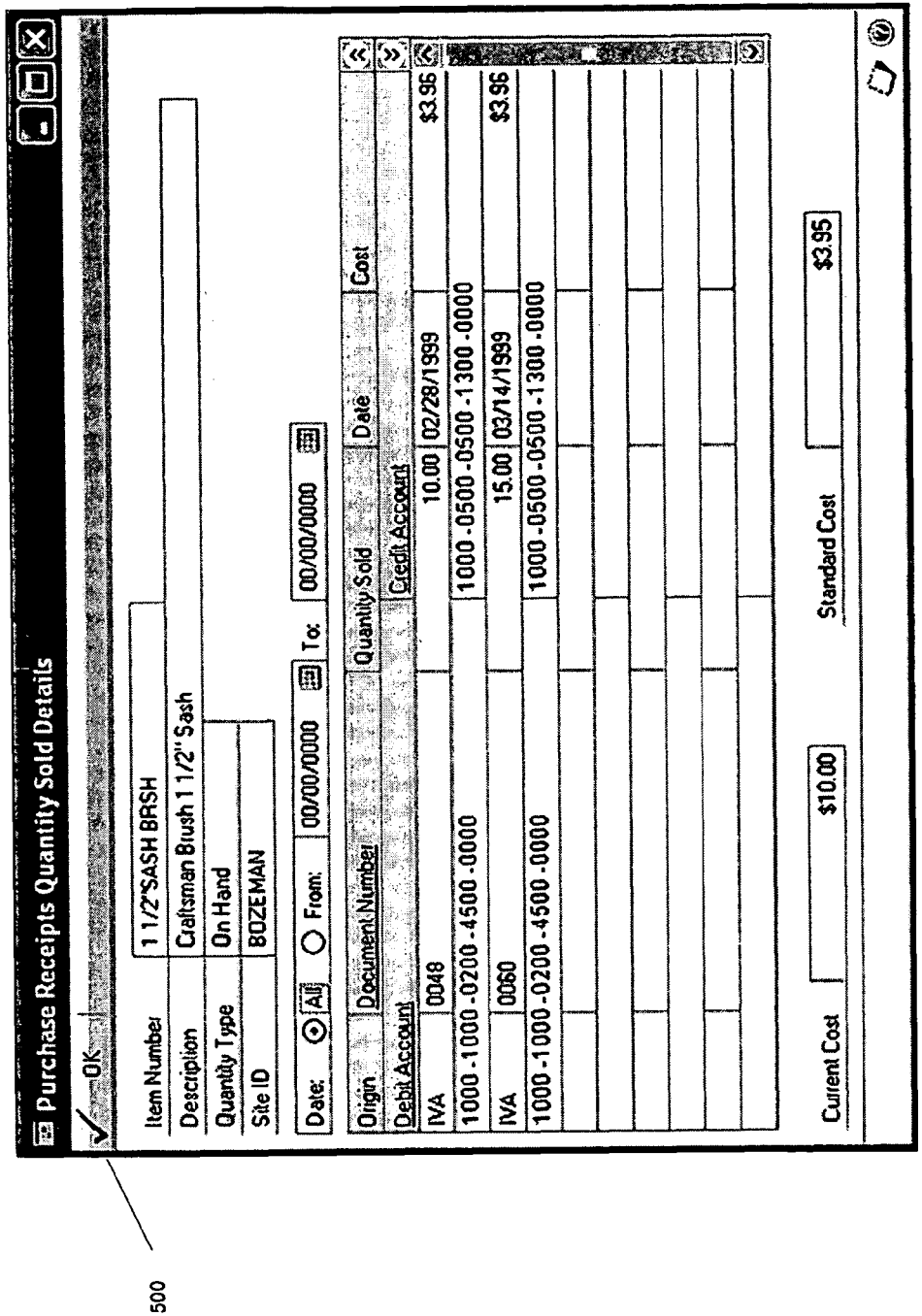

FIG. 4 may be a sample display of a purchase receipts inquiry page that may make use of the described methods; and FIG. 5 may be a display of the addition purchase receipts quantity sold detail.

DESCRIPTION

Although the following text sets fourth a detailed description of numerous different embodiments, it should be understood that the legal scope of the description is defined by the words of the claims set fourth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
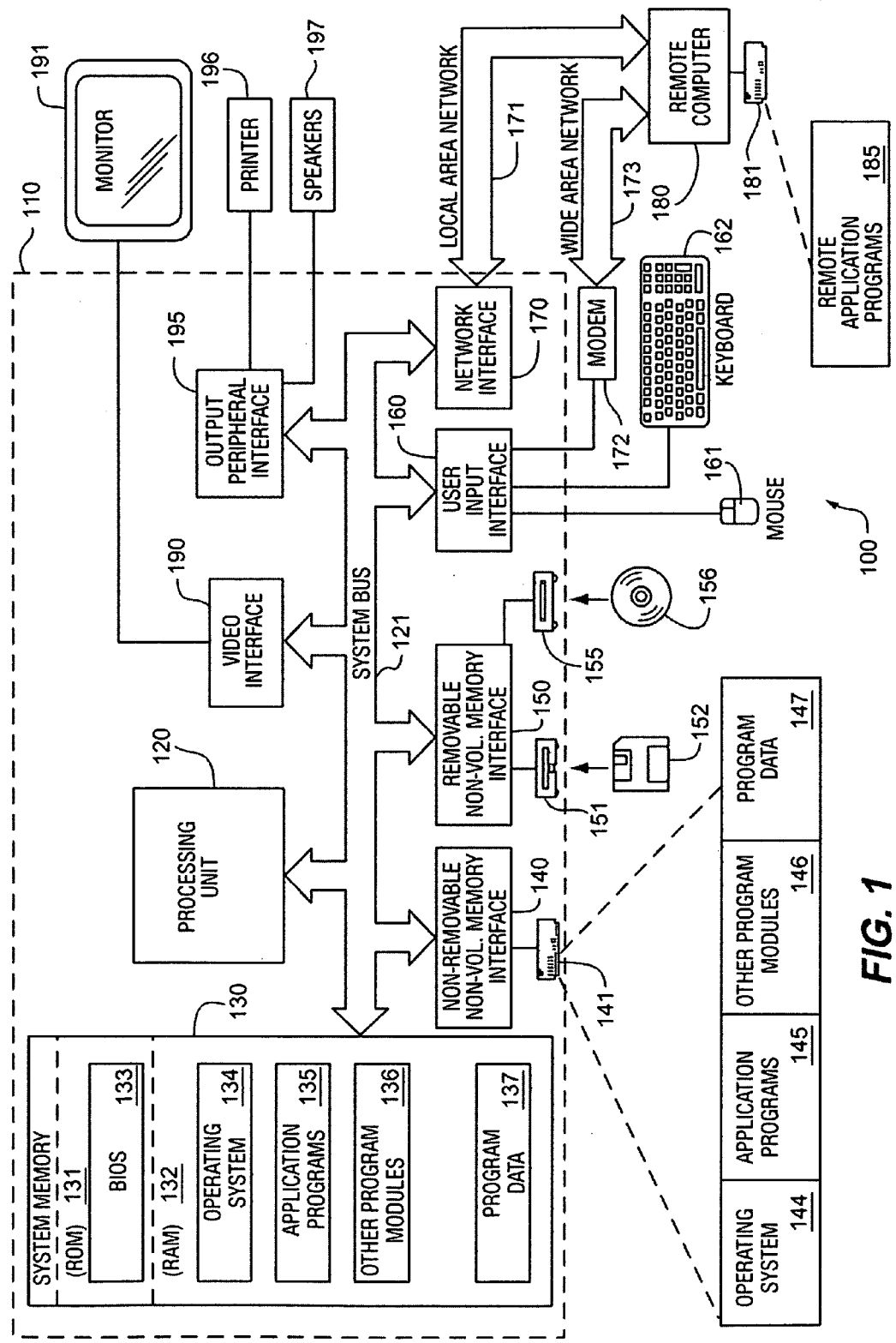
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Modern accounting systems are terrific at tracking data and automating tasks that previously had been performed by hand. However, the flexibility of these systems to handle events that occur outside the normal course of business has been a weakness. For example, if a user forgets to timely enter a purchase, a sale or other inventory usage (such as consuming inventory for manufacturing), averages that were previously calculated may not be updated as if the purchase or sale was timely entered. For example, to provide a true moving-average cost for inventory items, a software application must recalculate the average cost whenever you post a transaction that increases the on hand quantity or possibly decreases the quantity on hand.

Figure 2:
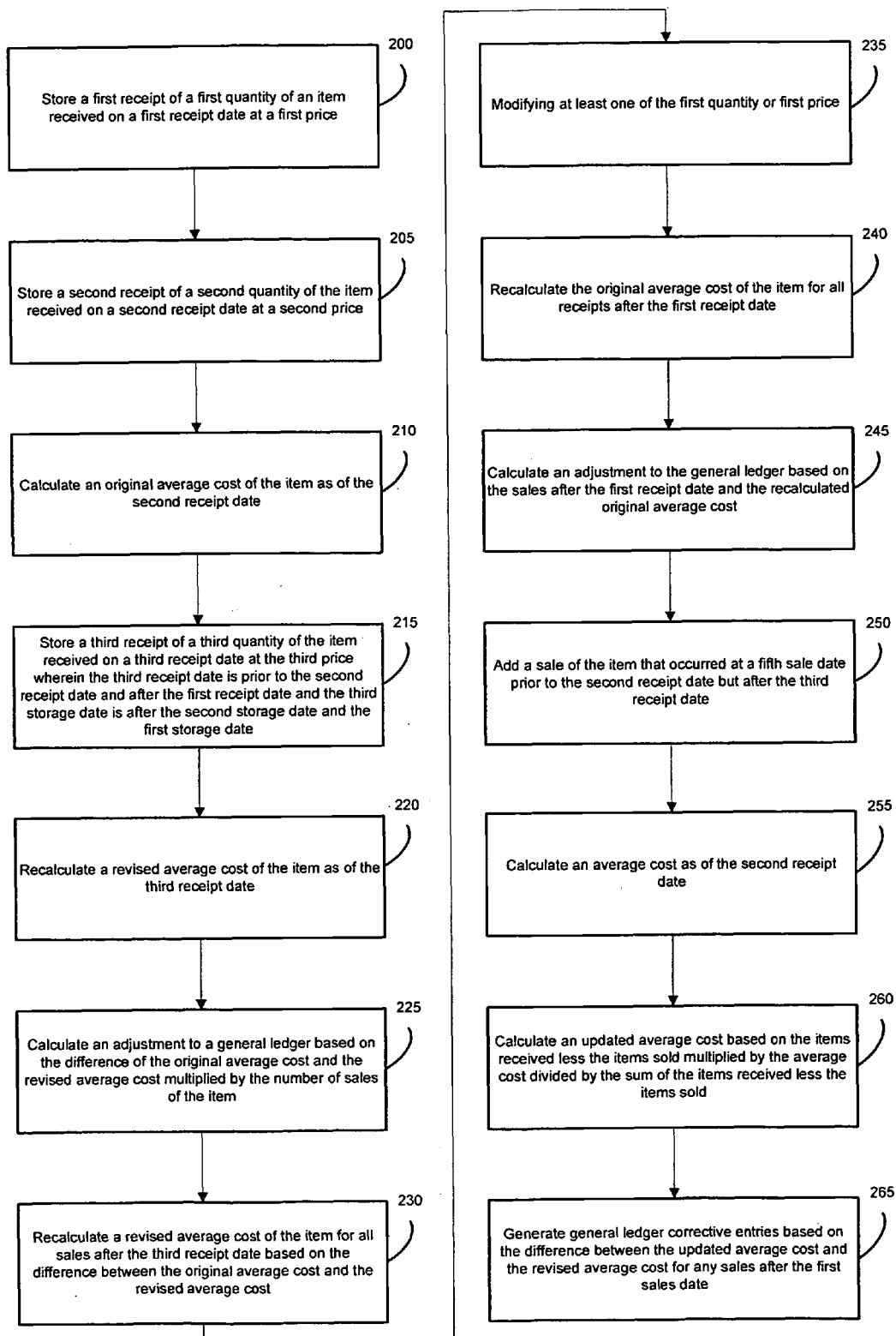
FIG. 2 is a flowchart of a method in accordance with the claims.

FIG. 2 may illustrate a method to adjust average costs to take into account later entered transactions that occurred at a previous date. The method may also automatically generate general ledger entries to reflect the updated average cost. At a high level, the method may operate as described in FIG. 2. At block, 200 on a first storage date the method may store a first receipt of a first quantity of an item received on a first receipt date at a first price. At block 205, the method may, on a second storage date, store a second receipt of a second quantity of the item received on a second receipt date at a second price. At block 210, the method may calculate an original average cost of the item as of the second receipt date by multiplying the first quantity and the first price adding the second quantity multiplied by the second price and dividing by the sum of the first quantity and the second quantity.

At block 215, the method may, on a third storage date, store a third receipt of a third quantity of the item received on a third receipt data at the third price where the third receipt date is prior to the second receipt date and after the first receipt date and the third storage date is after the second storage date and the first storage date. At block 220, the method may recalculate a revised average cost of the item as of the third receipt date by multiplying the first quantity by the first price, adding the third quantity multiplied by the third price and dividing by the sum of the first quantity and the second quantity. At block 225, for sales that occurred on or after the third receipt date, the method may calculate an adjustment to a general ledger based on the difference of the original average cost and the revised average cost multiplied by the number of sales of the item. At block 230, the method may recalculate a revised average cost of the item for all sales after the third receipt date based on the difference between the original average cost and the revised average cost.

At block 235, the method may, on a fourth storage date which is after the first storage date, modify at least one of the first quantity or first price. At block 240, the method may recalculate the original average cost of the item for all receipts after the first receipt date. At block 245, the method may calculate an adjustment to the general ledger based on the sales after the first receipt date and the recalculated original average cost.

At block 250, the method may, on a fifth storage date which is after the second storage date, add a sale of the item that occurred at a fifth sale date which is prior to the second receipt date but after the third receipt date. At block 255, the method may calculate an average cost as of the second receipt date. At block 260, the method may calculate an updated average cost based on the items received less the items sold multiplied by the average cost divided by the sum of the items received less the items sold. At block 265, the method may generate general ledger corrective entries based on the difference between the updated average cost and the revised average cost for any sales after the first sales date.

In implementation, the method may store with each inventory increase a date effective quantity on hand ("QTY On Hand"). This is the QTY On Hand that was available for sale at that point in time. It also may store a date effective Adjusted Unit Cost, which may be the average cost of the inventory available for sale at that point in time. The method may determine if any sales were sold at the wrong unit cost, if any sales did transact at the wrong unit cost, the sales record is updated with the true unit cost and the General Ledger is updated to reflect the difference between the old unit cost and the new and corrected unit cost.

The following terms are used in the following examples and the description may enhance understanding of the principles. The descriptions are not meant to be limiting, but merely examples:

| | | |
|---|---|---|
| Adjusted Unit Cost | (AUC) | This is the date effective Unit Cost stored with each increase receipt layer. |
| Unit Cost | (UC) | This may be the Unit Cost recorded with the transaction. |
| QTY On Hand | (QOH) | This may be the date effective QTY On Hand stored with each increase receipt layer. |
| QTY Received | ($QR_x$) | This may be the quantity received and may be stored with each increase layer. |
| QTY Sold | (QTY Sold) | This may be the quantity decreased which may be stored with each decrease inventory layer. |
| ΣQTY Sold | | This may be the running sum of the QTY Sold from the current increase layer to the following increase layer ordered by date. |
| Layer: | | Each receipt or sales that may require a new entry into the system. |

The equations below are used to calculate the QTY On Hand (QOH) and the Adjusted Unit Cost (AUC). The subscript n in the following formulas may refer to receipt layers only.

$$QOH_n = QOH_{n-1} + QRx_n - \sum QTY\ Sold_{n...n+1}$$

$$AUC_n = \frac{(QOH_{n-1} * AUC_{n-1}) + (QRx_n * UC_n)}{QOH_{n-1} + QRx_n}$$

Figure 3:
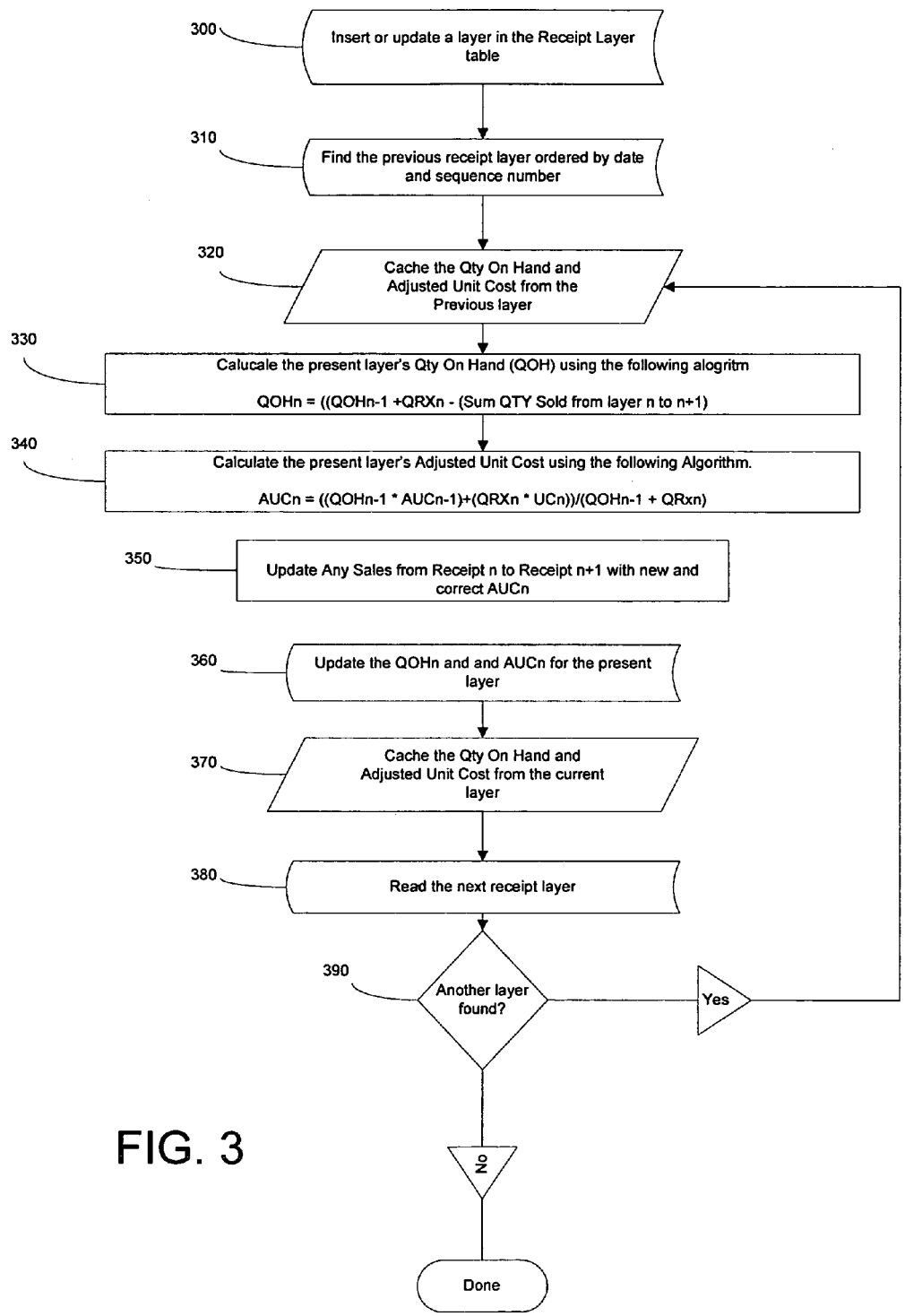
FIG. 3 is another flowchart of a method in accordance with the claims.

FIG. 3 may be an illustration of implementing the method. At block 300, the method may insert or update a record in the Receipt Layer table. As mentioned previously, a layer may be an entry that requires a new entry in the data storage database or the modification of an entry in the database. At block 310, the method may find the previous receipt layer ordered by date and sequence number. At block 320, the method may store in cache for example the Qty On Hand and Adjusted Unit Cost from the previous layer. The method may store the data in a variety of formats, including XML format. At block 330, the method may calculate the present layer's (or row's) Qty On Hand (QOH) using the algorithm:

$QOHn=((QOH_{n-1}+QRX_n-(\text{Sum } QTY \text{ Sold from layer } n \text{ to } n+1))$.

At block 340, the method may calculate the present layer's Adjusted Unit Cost using the following algorithm:

$AUC_n=((QOH_{n-1}*AUC_{n-1})+(QRX_n*UC_n))/(QOH_{n-1}+QRX_n)$

At block 350, the method may update any sales from receipt n to receipt n+1 with new and correct AUCn. At block 360, the method may update the QOHn and AUCn for the present layer. At block 370, the method may store, in a cache for example, the Qty On Hand and Adjusted Unit Cost from the current layer. At block 380, the method may read the next receipt layer. If at block 390 another record is found, the method may pass control to block 320. If another record is not found, the method may end.

An example will make things easier to understand. Say that the following receipts and sales are recorded.

| Date | Transaction Type | QTY Received | QTY Sold | QTY On Hand | Unit Cost | Adj Unit Cost |
|---|---|---|---|---|---|---|
| Jun. 01 1999 | Receipt | 10.0 | | 10.0 | $2.00 | $2.00 |
| Jun. 10 1999 | Receipt | 15.0 | | 11.0 | $4.00 | $3.20 |
| Jun. 20 1999 | Sale | | 7.0 | | | $3.20 |
| Jun. 01 1999 | Sale | | 7.0 | | | $3.20 |
| Jun. 10 1999 | Receipt | 20.0 | | 31.0 | $5.00 | $4.36 |

In addition to the challenge of using the correct formula and storing the required attributes, there may be an issue created when a quantity of that item has already been removed from inventory but the average cost for that item gets recalculated. Proper accounting should have the system generate general ledger adjusting transactions for the amount by which the cost changed.

Now assume that a user forgot to book a inventory receipt for quantity of 20 on date Jun. 05, 1999 (shown below in bold), this will cause the date effective QOH and date effective AUC's to be recalculated as if the inventory was available for sale on that date. Again an example may provide clarity.

| Date | Transaction Type | QTY Received | QTY Sold | QTY On Hand | Unit Cost | Adj Unit Cost | Amount to adjust General Ledger |
|---|---|---|---|---|---|---|---|
| Jun. 01 1999 | Receipt | 10.0 | | 10.0 | $2.00 | $2.00 | |
| Jun. 05 1999 | Receipt | 10.0 | | 20.0 | $4.00 | $3.00 | |
| Jun. 10 1999 | Receipt | 15.0 | | 21.0 | $4.00 | $3.43 | |
| Jun. 20 1999 | Sale | | 7.0 | | | $3.43 | 7 × ($3.43 − $3.20) = $1.61 |
| Jul. 01 1999 | Sale | | 7.0 | | | $3.43 | 7 × ($3.43 − $3.20) = $1.61 |
| Jul. 10 1999 | Receipt | 20.0 | | 41.0 | $5.00 | $4.20 | |

Note that the date Effective QTY On Hand and Adjusted Unit Cost fields were recalculated as if the inventory were actually received on Jun. 05, 1999 and the sales on Jun. 20, 1999 and Jul. 01, 1999 originally were sold at a lower cost ($3.20) than would have been true if the inventory had actually been available for sale on Jun. 05, 1999 ($3.43). The General Ledger should be adjusted to reflect that the Cost of Goods Sold was understated by $1.61+$1.61=$3.22.

Another scenario may be where the receipt cost did not actually agree with the invoice cost from the vendor. Again, an example may provide clarity. In this case the receipt on Jun. 01, 1999 was recorded with a Unit Cost of $2.00, however at the end of June, the statement from the vendor indicates that the actual unit cost for the receipt of Jun. 01, 1999 was really $2.50. This will force the date effective Adjusted Unit Costs to be recalculated and unit cost on any subsequent sales would have been understated.

| Date | Transaction Type | QTY Received | QTY Sold | QTY On Hand | Unit Cost | Adj Unit Cost | Amount to adjust General Ledger |
|---|---|---|---|---|---|---|---|
| Jun. 01 1999 | Receipt | 10.0 | | 10.0 | $2.50 | $2.50 | |
| Jun. 05 1999 | Receipt | 10.0 | | 20.0 | $4.00 | $3.25 | |
| Jun. 10 1999 | Receipt | 15.0 | | 21.0 | $4.00 | $3.57 | |
| Jun. 20 1999 | Sale | | 7.0 | | | $3.57 | 7.0 * ($3.57 − 3.43) = $0.98 |
| Jul. 01 1999 | Sale | | 7.0 | | | $3.57 | 7.0 * ($3.57 − 3.43) = $0.98 |
| Jul. 10 1999 | Receipt | 20.0 | | 41.0 | $5.00 | $4.27 | |

Note that the date effective Adjusted Unit Cost was updated and rippled through subsequent receipts in the stack and that any subsequent sales had to be revalued and an adjustment to the General Ledger was made for $0.98+$0.98=$1.96

Another scenario may be where a sale of QTY=5 occurred on 06/07/1999 (shown below in bold) but the user failed to actually record it on that date. Once again an example will be used.

| Date | Transaction Type | QTY Received | QTY Sold | QTY On Hand | Unit Cost | Adj Unit Cost | Amount to adjust General Ledger |
|---|---|---|---|---|---|---|---|
| Jun. 01 1999 | Receipt | 10.0 | | 10.0 | $2.50 | $2.50 | |
| Jun. 05 1999 | Receipt | 10.0 | | 15.0 | $4.00 | $3.25 | |
| Jun. 07 1999 | Sale | | 5.0 | | | $3.25 | |
| Jun. 10 1999 | Receipt | 15.0 | | 16.0 | $4.00 | $3.63 | |
| Jun. 20 1999 | Sale | | 7.0 | | | $3.63 | 7.0 * ($3.63 − 3.57) = $0.42 |
| Jul. 01 1999 | Sale | | 7.0 | | | $3.63 | 7.0 * ($3.63 − 3.57) = $0.42 |
| Jul. 10 1999 | Receipt | 20.0 | | 36.0 | $5.00 | $4.39 | |

Note that the date effective QTY On Hand and date effective Adjusted Unit Cost were recalculated and subsequent sales were revalued and an adjustment was made to the General Ledger.

Accordingly, the method may keep a date effective Quantity On Hand and date effective Adjusted Unit Cost with each inventory layer. In addition, the method may provide a method which keeps the date effective Quantity On Hand and Adjusted Unit Cost correct, especially when receipts or decreases are posted in between receipt layers. The method may detect any sales that were sold at the wrong unit cost and updates the sales with the new and correct unit cost and automatically updates the General Ledger. The method may calculate the cost adjustments to "quantity sold" transactions based on the recalculated average costs and automatically update the General Ledger. The method may also calculate the "ripple" of the corrected average cost that corrects subsequent receipts.

FIG. 4 may be a sample display of a purchase receipts inquiry page 400 that may make use of the described methods. Selecting the highlighted phrase "QUANTITY SOLD" 410 may result in the display of addition detail of the quantity sold and FIG. 5 may be a display 500 of the addition purchase receipts quantity sold detail.

The method may also have a set of permissions that enable only certain users to access the functions of the method. As the method is working with modifying accounting entries in the past, there exists the potential for a malicious person to modify the system in a malicious manner. Accordingly, the method may be limited to users with a high level of permission such as an administrator. In another version, a password may be requested before changes may be made to past data. In addition, the method may track users that have accessed this method such that if a change is made and is later determined to be malicious, it will be easier to track the malicious user. A separate report may be generated at month end that details the use of this method. Moreover, a message may be communicated to a supervisor if the method is used. Other security measures and notifications that the method has been used are certainly contemplated as part of the method.

Although the forgoing text sets fourth a detailed description of numerous different embodiments, it should be understood that the scope of the patent is defined by the words of the claims set fourth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of tracking costs in an accounting system operating on a computing device, the computing device comprising a processor configured to execute computer executable instructions and memory storing computer executable instructions of the accounting system that, when executed by the processor, cause the accounting system to perform steps comprising:

storing, in the memory, a quantity on hand (QOH) of an item and a unit cost of the item for the QOH of the item;

storing, in the memory, a receipt record (n) for a receipt transaction, the receipt record (n) including a quantity of the item received in the receipt transaction ($OR_n$), a receipt date of the receipt transaction, and a unit cost of the item for the receipt transaction ($UC_n$);

recording, in the receipt record (n), an original date effective adjusted unit cost of the item for the receipt transaction ($AUC_n$) which is calculated by multiplying the QOH of the item by the unit cost of the item for the QOH of the item, adding the quantity of the item received in the receipt transaction ($OR_n$) multiplied by the unit cost of the item for the receipt transaction ($UC_n$), and dividing by a sum of the QOH of the item and the quantity of the item received in the receipt transaction ($OR_n$);

storing, in the memory, a plurality of sales records for sale transactions that occurred after the receipt transaction, each sales record including a quantity of the item sold, a date of sale, and an original unit cost of the item sold which is set to the original date effective adjusted unit cost of the item for the receipt transaction ($AUC_n$);

storing, in the memory, a next receipt record (n+1) for a next receipt transaction that occurred after the plurality of sale transactions, the next receipt record (n+1) including a quantity of the item received in the next receipt transaction, a receipt date of the next receipt transaction, and a unit cost of the item for the next receipt transaction;

recording, in the receipt record (n), a date effective QOH of the item for the receipt transaction ($QOH_n$) which is calculated by subtracting a sum of the quantities of the item sold between the receipt record (n) and the next receipt record (n+1) from the sum of QOH of the item and the quantity of the item received in the receipt transaction ($QR_n$);

storing, in the memory, a previous receipt record (n−1) for a previous receipt transaction, the previous receipt record (n−1) including a quantity of the item received in the previous receipt transaction, a receipt date of the previous receipt transaction which is prior to the receipt date of the receipt transaction, and a unit cost of the item for the previous receipt transaction;

calculating a date effective adjusted unit cost of the item for the previous receipt transaction ($AUC_{n-1}$) and a date effective QOH of the item for the previous receipt transaction ($QOH_{n-1}$);

recording, in the receipt record (n), a revised date effective adjusted unit cost of the item for the receipt transaction ($AUC_n$) calculated by multiplying the quantity of the item received in the receipt transaction ($QR_n$) by the unit cost of the item for the receipt transaction ($UC_n$), adding the date effective QOH of the item for the previous receipt transaction ($QOH_{n-1}$) multiplied by the date effective adjusted unit cost of the item for the previous receipt transaction ($AUC_{n-1}$), and dividing by a sum of the quantity of the item received in the receipt transaction ($QR_n$) and the date effective QOH of the item for the previous receipt transaction ($QOH_{n-1}$);

recording, in the receipt record (n), a revised date effective QOH of the item for the receipt transaction ($QOH_n$) which is calculated by subtracting the sum of the quantities of the item sold between the receipt record (n) and the next receipt record (n+1) from the sum of the quantity of the item received in the receipt transaction ($QR_n$) and the date effective QOH of the item for the previous receipt transaction ($QOH_{n-1}$);

recording, in the each of the plurality of sales records between the receipt record (n) and the next receipt record (n+1), a revised unit cost of the item sold which is set to the revised date effective adjusted unit cost of the item for the receipt transaction ($AUC_n$);

recording, in the each of the plurality of sales records between the receipt record (n) and the next receipt record (n+1), an adjustment to a general ledger which is calculated by multiplying the quantity of the item sold in each sales record by a difference between the original date effective adjusted unit cost of the item for the receipt transaction and the revised date effective adjusted unit cost for the receipt transaction to reflect that the original unit cost of the item sold was understated in each sales record;

recording, in the next receipt record (n+1), a date effective adjusted unit cost of the item for the next receipt transaction calculated by multiplying the quantity of the item received in the next transaction by the unit cost of the item for the next transaction, adding the revised date effective QOH of the item for the receipt transaction multiplied by the revised date effective adjusted unit cost of the item for the receipt transaction, and dividing by a sum of the quantity of the item received in the next transaction and the revised date effective QOH of the item for the receipt transaction; and recording, in the next receipt record (n+1), a date effective QOH of the item for the next receipt transaction which is calculated by subtracting quantities of the item sold from all sales records between the receipt record (n+1) and a subsequent receipt record for a subsequent receipt transaction from the sum of the quantity of the item received in the next receipt transaction and the revised date effective QOH of the item for the receipt transaction.

2. The method of claim 1, wherein each receipt record and sales record is stored in the memory in XML format.

3. The method of claim 1, wherein the accounting system requires a threshold level of authority to execute the steps.

4. The method of claim 1, wherein the accounting system requires a password to execute one or more individual steps.

5. The method of claim 1, wherein the accounting system tracks users when one or more of the steps have been executed.

6. The method of claim 1, wherein the steps further comprise:

updating the receipt record (n) to include an updated quantity of the item received in the receipt transaction and an updated unit cost of the item for the receipt transaction;

finding the previous receipt record (n+1) in the memory;

updating, in the receipt record (n), the revised date effective QOH of the item for the receipt transaction and by subtracting the sum of the quantities of the item sold between the receipt record (n) and the next receipt record (n+1) from the sum of the updated quantity of the item received in the receipt transaction and the date effective QOH of the item for the previous receipt transaction ($QOH_{n-1}$);

updating, in the receipt record (n), the revised date effective adjusted unit cost of the item for the receipt transaction ($AUC_n$) by multiplying the updated quantity of the item received in the receipt transaction ($QR_n$) by the updated unit cost of the item for the receipt transaction, adding the date effective QOH of the item for the previous receipt transaction ($QOH_{n-1}$) multiplied by the date effective adjusted unit cost of the item for the previous receipt transaction ($AUC_{n-1}$), and dividing by a sum of the updated quantity of the item received in the receipt transaction ($QR_n$) and the date effective QOH of the item for the previous receipt transaction ($QOH_{n-1}$);

updating, in the each of the plurality of sales records between the receipt record (n) and the next receipt record (n+1), the revised unit cost of the item sold and the adjustment to the general ledger; and updating, in the next receipt record (n+1), the date effective adjusted unit cost of the item for the next receipt transaction and the date effective QOH of the item for the next receipt transaction.

7. A computing device comprising a processor configured to execute computer executable instructions and memory storing computer executable instructions of an accounting system that, when executed by the processor, cause the accounting system to perform steps comprising:

storing, in the memory, a quantity on hand (QOH) of an item and a unit cost of the item for the QOH of the item;

storing, in the memory, a receipt record (n) for a receipt transaction, the receipt record (n) including a quantity of the item received in the receipt transaction ($OR_n$), a receipt date of the receipt transaction, and a unit cost of the item for the receipt transaction ($UC_n$);

recording, in the receipt record (n), an original date effective adjusted unit cost of the item for the receipt transaction ($AUC_n$) which is calculated by multiplying the QOH of the item by the unit cost of the item for the QOH of the item, adding the quantity of the item received in the receipt transaction ($OR_n$) multiplied by the unit cost of the item for the receipt transaction ($UC_n$), and dividing by a sum of the QOH of the item and the quantity of the item received in the receipt transaction ($OR_n$);

storing, in the memory, a plurality of sales records for sale transactions that occurred after the receipt transaction, each sales record including a quantity of the item sold, a date of sale, and an original unit cost of the item sold which is set to the original date effective adjusted unit cost of the item for the receipt transaction ($AUC_n$);

storing, in the memory, a next receipt record (n+1) for a next receipt transaction that occurred after the plurality of sale transactions, the next receipt record (n+1) including a quantity of the item received in the next receipt transaction, a receipt date of the next receipt transaction, and a unit cost of the item for the next receipt transaction;

recording, in the receipt record (n), a date effective QOH of the item for the receipt transaction ($QOH_n$) which is calculated by subtracting a sum of the quantities of the item sold between the receipt record (n) and the next receipt record (n+1) from the sum of QOH of the item and the quantity of the item received in the receipt transaction ($QR_n$);

storing, in the memory, a previous receipt record (n−1) for a previous receipt transaction, the previous receipt record (n−1) including a quantity of the item received in the previous receipt transaction, a receipt date of the previous receipt transaction which is prior to the receipt date of the receipt transaction, and a unit cost of the item for the previous receipt transaction;

calculating a date effective adjusted unit cost of the item for the previous receipt transaction ($AUC_{n-1}$) and a date effective QOH of the item for the previous receipt transaction ($QOH_{n-1}$);

recording, in the receipt record (n), a revised date effective adjusted unit cost of the item for the receipt transaction ($AUC_n$) calculated by multiplying the quantity of the item received in the receipt transaction ($QR_n$) by the unit cost of the item for the receipt transaction ($UC_n$), adding the date effective QOH of the item for the previous receipt transaction ($QOH_{n-1}$) multiplied by the date effective adjusted unit cost of the item for the previous receipt transaction ($AUC_{n-1}$), and dividing by a sum of the quantity of the item received in the receipt transaction ($QR_n$) and the date effective QOH of the item for the previous receipt transaction ($QOH_{n-1}$);

recording, in the receipt record (n), a revised date effective QOH of the item for the receipt transaction ($QOH_n$) which is calculated by subtracting the sum of the quantities of the item sold between the receipt record (n) and the next receipt record (n+1) from the sum of the quantity of the item received in the receipt transaction ($QR_n$) and the date effective QOH of the item for the previous receipt transaction ($QOH_{n-1}$);

recording, in the each of the plurality of sales records between the receipt record (n) and the next receipt record (n+1), a revised unit cost of the item sold which is set to the revised date effective adjusted unit cost of the item for the receipt transaction ($AUC_n$);

recording, in the each of the plurality of sales records between the receipt record (n) and the next receipt record (n+1), an adjustment to a general ledger which is calculated by multiplying the quantity of the item sold in each sales record by a difference between the original date effective adjusted unit cost of the item for the receipt transaction and the revised date effective adjusted unit cost for the receipt transaction to reflect that the original unit cost of the item sold was understated in each sales record;

recording, in the next receipt record (n+1), a date effective adjusted unit cost of the item for the next receipt transaction calculated by multiplying the quantity of the item received in the next transaction by the unit cost of the item for the next transaction, adding the revised date effective QOH of the item for the receipt transaction multiplied by the revised date effective adjusted unit cost of the item for the receipt transaction, and dividing by a sum of the quantity of the item received in the next transaction and the revised date effective QOH of the item for the receipt transaction; and recording, in the next receipt record (n+1), a date effective QOH of the item for the next receipt transaction which is calculated by subtracting quantities of the item sold from all sales records between the receipt record (n+1) and a subsequent receipt record for a subsequent receipt transaction from the sum of the quantity of the item received in the next receipt transaction and the revised date effective QOH of the item for the receipt transaction.

8. The computing device of claim 7, wherein each receipt record and sales record is stored in the memory in XML format.

9. The computing device of claim 7, wherein the accounting system requires a threshold level of authority to execute the steps.

10. The computing device of claim 7, wherein the accounting system requires a password to execute one or more individual steps.

11. The computing device of claim 7, wherein the accounting system tracks users when one or more of the steps have been executed.

12. The computing device of claim 7, wherein the steps further comprise:

updating the receipt record (n) to include an updated quantity of the item received in the receipt transaction and an updated unit cost of the item for the receipt transaction;

finding the previous receipt record (n+1) in the memory;

updating, in the receipt record (n), the revised date effective QOH of the item for the receipt transaction and by subtracting the sum of the quantities of the item sold between the receipt record (n) and the next receipt record (n+1) from the sum of the updated quantity of the item received in the receipt transaction and the date effective QOH of the item for the previous receipt transaction ($QOH_{n-1}$);

updating, in the receipt record (n), the revised date effective adjusted unit cost of the item for the receipt transaction ($AUC_n$) by multiplying the updated quantity of the item received in the receipt transaction ($QR_n$) by the updated unit cost of the item for the receipt transaction, adding the date effective QOH of the item for the previous receipt transaction ($QOH_{n-1}$) multiplied by the date effective adjusted unit cost of the item for the previous receipt transaction ($AUC_{n-1}$), and dividing by a sum of the updated quantity of the item received in the receipt transaction ($QR_n$) and the date effective QOH of the item for the previous receipt transaction ($QOH_{n-1}$);

updating, in the each of the plurality of sales records between the receipt record (n) and the next receipt record (n+1), the revised unit cost of the item sold and the adjustment to the general ledger; and updating, in the next receipt record (n+1), the date effective adjusted unit cost of the item for the next receipt transaction and the date effective QOH of the item for the next receipt transaction.

13. A computer storage medium storing computer executable instructions of an accounting system that, when executed by a processor of a computing device, cause the accounting system to perform steps comprising:

storing, in memory of the computing device, a quantity on hand (QOH) of an item and a unit cost of the item for the QOH of the item;

storing, in the memory, a receipt record (n) for a receipt transaction, the receipt record (n) including a quantity of the item received in the receipt transaction ($OR_n$), a receipt date of the receipt transaction, and a unit cost of the item for the receipt transaction ($UC_n$);

recording, in the receipt record (n), an original date effective adjusted unit cost of the item for the receipt transaction ($AUC_n$) which is calculated by multiplying the QOH of the item by the unit cost of the item for the QOH of the item, adding the quantity of the item received in the receipt transaction ($OR_n$) multiplied by the unit cost of the item for the receipt transaction ($UC_n$), and dividing by a sum of the QOH of the item and the quantity of the item received in the receipt transaction ($OR_n$);

storing, in the memory, a plurality of sales records for sale transactions that occurred after the receipt transaction, each sales record including a quantity of the item sold, a date of sale, and an original unit cost of the item sold which is set to the original date effective adjusted unit cost of the item for the receipt transaction ($AUC_n$);

storing, in the memory, a next receipt record (n+1) for a next receipt transaction that occurred after the plurality of sale transactions, the next receipt record (n+1) including a quantity of the item received in the next receipt transaction, a receipt date of the next receipt transaction, and a unit cost of the item for the next receipt transaction;

recording, in the receipt record (n), a date effective QOH of the item for the receipt transaction ($QOH_n$) which is calculated by subtracting a sum of the quantities of the item sold between the receipt record (n) and the next receipt record (n+1) from the sum of QOH of the item and the quantity of the item received in the receipt transaction ($QR_n$);

storing, in the memory, a previous receipt record (n−1) for a previous receipt transaction, the previous receipt record (n−1) including a quantity of the item received in the previous receipt transaction, a receipt date of the previous receipt transaction which is prior to the receipt date of the receipt transaction, and a unit cost of the item for the previous receipt transaction;

calculating a date effective adjusted unit cost of the item for the previous receipt transaction ($AUC_{n-1}$) and a date effective QOH of the item for the previous receipt transaction ($QOH_{n-1}$);

recording, in the receipt record (n), a revised date effective adjusted unit cost of the item for the receipt transaction ($AUC_n$) calculated by multiplying the quantity of the item received in the receipt transaction ($QR_n$) by the unit cost of the item for the receipt transaction ($UC_n$), adding the date effective QOH of the item for the previous receipt transaction ($QOH_{n-1}$) multiplied by the date effective adjusted unit cost of the item for the previous receipt transaction ($AUC_{n-1}$), and dividing by a sum of the quantity of the item received in the receipt transaction ($QR_n$) and the date effective QOH of the item for the previous receipt transaction ($QOH_{n-1}$);

recording, in the receipt record (n), a revised date effective QOH of the item for the receipt transaction ($QOH_n$) which is calculated by subtracting the sum of the quantities of the item sold between the receipt record (n) and the next receipt record (n+1) from the sum of the quantity of the item received in the receipt transaction ($QR_n$) and the date effective QOH of the item for the previous receipt transaction ($QOH_{n-1}$);

recording, in the each of the plurality of sales records between the receipt record (n) and the next receipt record (n+1), a revised unit cost of the item sold which is set to the revised date effective adjusted unit cost of the item for the receipt transaction ($AUC_n$);

recording, in the each of the plurality of sales records between the receipt record (n) and the next receipt record (n+1), an adjustment to a general ledger which is calculated by multiplying the quantity of the item sold in each sales record by a difference between the original date effective adjusted unit cost of the item for the receipt transaction and the revised date effective adjusted unit cost for the receipt transaction to reflect that the original unit cost of the item sold was understated in each sales record;

recording, in the next receipt record (n+1), a date effective adjusted unit cost of the item for the next receipt transaction calculated by multiplying the quantity of the item received in the next transaction by the unit cost of the item for the next transaction, adding the revised date effective QOH of the item for the receipt transaction multiplied by the revised date effective adjusted unit cost of the item for the receipt transaction, and dividing by a sum of the quantity of the item received in the next transaction and the revised date effective QOH of the item for the receipt transaction; and recording, in the next receipt record (n+1), a date effective QOH of the item for the next receipt transaction which is calculated by subtracting quantities of the item sold from all sales records between the receipt record (n+1) and a subsequent receipt record for a subsequent receipt transaction from the sum of the quantity of the item received in the next receipt transaction and the revised date effective QOH of the item for the receipt transaction.

14. The computer storage medium of claim 13, wherein each receipt record and sales record is stored in the memory in XML format.

15. The computer storage medium of claim 13, wherein the accounting system requires a threshold level of authority to execute the steps.

16. The computer storage medium of claim 13, wherein the accounting system requires a password to execute one or more individual steps.

17. The compute storage medium of claim 13, wherein the accounting system tracks users when one or more of the steps have been executed.

18. The computer storage medium of claim 13, wherein the steps further comprise:

updating the receipt record (n) to include an updated quantity of the item received in the receipt transaction and an updated unit cost of the item for the receipt transaction;

finding the previous receipt record (n+1) in the memory;

updating, in the receipt record (n), the revised date effective QOH of the item for the receipt transaction and by subtracting the sum of the quantities of the item sold between the receipt record (n) and the next receipt record (n+1) from the sum of the updated quantity of the item received in the receipt transaction and the date effective QOH of the item for the previous receipt transaction ($QOH_{n-1}$);

updating, in the receipt record (n), the revised date effective adjusted unit cost of the item for the receipt transaction ($AUC_n$) by multiplying the updated quantity of the item received in the receipt transaction ($QR_n$) by the updated unit cost of the item for the receipt transaction, adding the date effective QOH of the item for the previous receipt transaction ($QOH_{n-1}$) multiplied by the date effective adjusted unit cost of the item for the previous receipt transaction ($AUC_{n-1}$), and dividing by a sum of the updated quantity of the item received in the receipt transaction ($QR_n$) and the date effective QOH of the item for the previous receipt transaction ($QOH_{n-1}$);

updating, in the each of the plurality of sales records between the receipt record (n) and the next receipt record (n+1), the revised unit cost of the item sold and the adjustment to the general ledger; and updating, in the next receipt record (n+1), the date effective adjusted unit cost of the item for the next receipt transaction and the date effective QOH of the item for the next receipt transaction.

* * * * *